Dec. 14, 1965   J. J. LEVENSON   3,222,698
RESILIENT PLASTIC SEAT ELEMENTS
Filed Dec. 13, 1962   2 Sheets-Sheet 1

INVENTOR.
John J. Levenson
BY
J. L. Carpenter
ATTORNEY

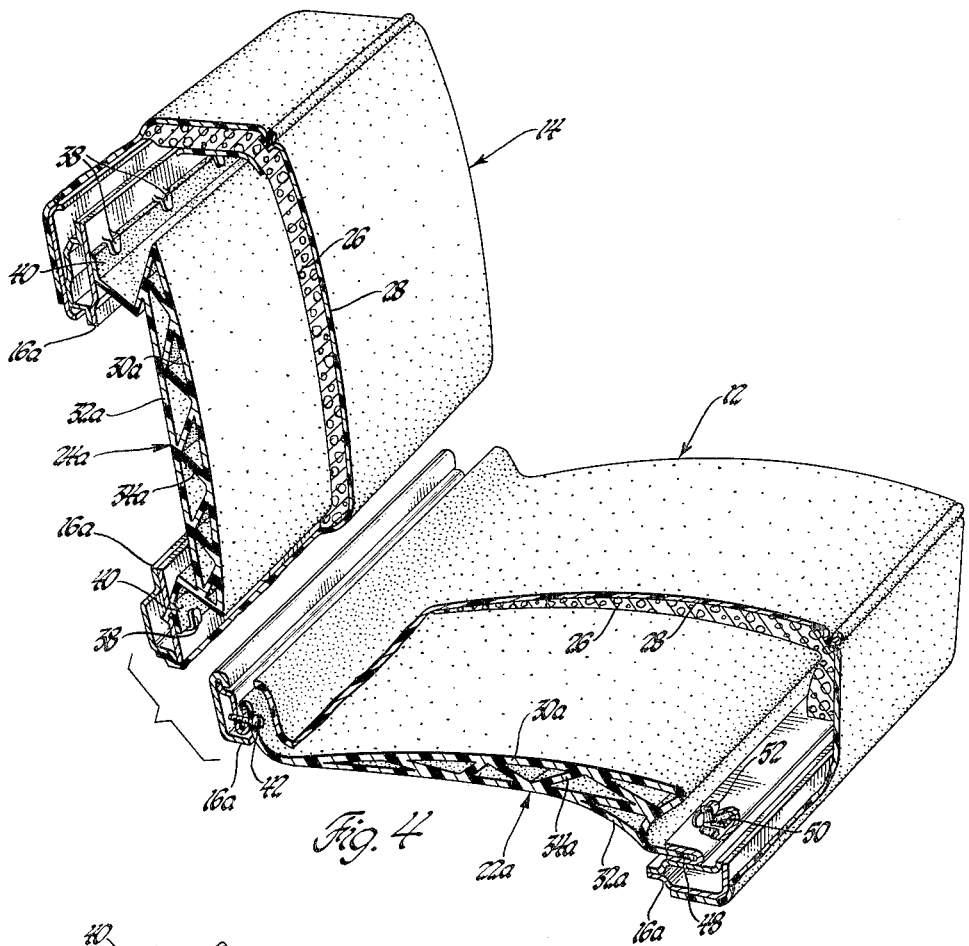

United States Patent Office 3,222,698
Patented Dec. 14, 1965

3,222,698
RESILIENT PLASTIC SEAT ELEMENTS
John J. Levenson, St. Clair Shores, Mich., assignor to General Motors Corporation, Detroit, Mich., a corporation of Delaware
Filed Dec. 13, 1962, Ser. No. 244,475
5 Claims. (Cl. 5—361)

This invention relates to spring elements for upholstery purposes and more particularly to an extruded plastic spring element for use with the usual padding and trim material in a seating unit.

The conventional seat construction utilizes a multiplicity of spring elements which are hand assembled on a seat frame. Padding and trim materials are placed over the spring elements to complete the seat assembly.

The present invention uses a plastic extrusion in place of the multiple seat springs and will provide a controlled seat contour that is easier and less expensive to assemble.

An object of this invention is to provide a single unitary plastics support element to replace the conventional multiple springs used in seat construction.

A further object of this invention is to provide an extruded spring element which will be less expensive to manufacture and assemble.

Another object of this invention is to provide spring elements which will be more accurately formed thus reducing the waste of material from excessive trimming and fitting of the padding and trim material.

These and other objects of this invention will become more apparent as reference is had to the enclosed drawings and the following specification wherein:

FIGURE 4 is a perspective view of a seat back and seat cushion, with sections cut away, utilizing the conventional seat frame, padding and trim covering with the novel reinforced extruded plastics spring elements used therein.

FIGURE 5 shows a portion of a modified extruded plastics seat back spring element.

FIGURE 6 shows a modified extruded plastics seat spring element, with sections broken awy, showing an alternate means for attaching the element to the seat frame.

Figure 1:
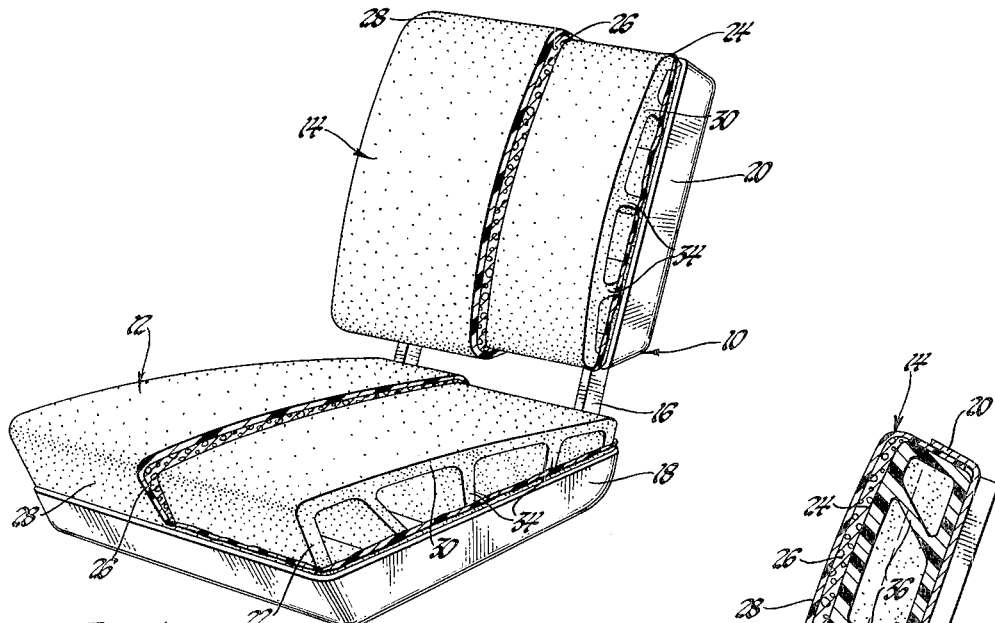
FIGURE 1 is a view of a seat assembly, with sections cut away, showing the novel spring elements in assembled position with conventional padding and trim coverings.
Figure 2:
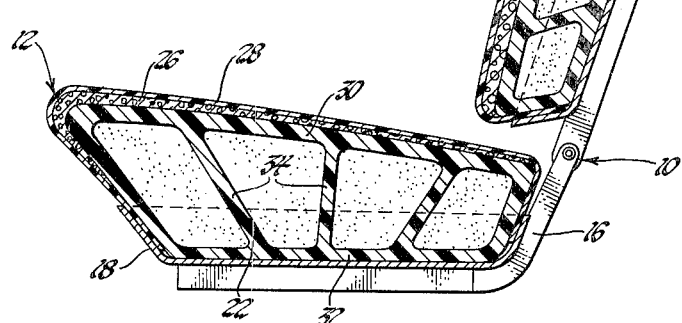
FIGURE 2 is a sectional side view of the seating unit shown in FIGURE 1.
Figure 3:
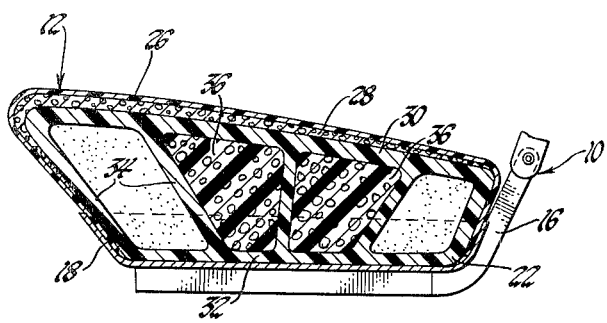
FIGURE 3 is a sectional side view of the seat cushion showing cavities of the extruded spring element filled with a resilient material to increase the support in specific areas of the seat cushion.

Referring now to the drawings wherein like parts are designated by the same numerals. In FIGURES 1, 2 and 3, there is shown a seating unit 10 having a seat cushion 12 and a seat back cushion 14 assembled on a seat frame 16.

Secured to the seat frame 16 by suitable means is a seat support pan 18 and a seat back support pan 20. A unitary seat support element 22 of synthetic material is secured in the seat pan and a similar seat back support element 24 is secured to the seat back pan 20. The support elements 22 and 24 could be made from an extruded plastic such as polyvinyl chloride or polyethylene but are not necessarily limited to these materials. To complete the seat assembly, conventional foam rubber padding 26 and fabric or plastic covers 28 are used.

The seat support elements 22, 24 are designed to be manufactured by extrusion of plastics through an extrusion die to form strips of the desired cross-sectional truss design. These strips may then be cut in the seat unit lengths, properly blanked or pierced for attaching and installed in the pan or on the seat frame as a unit. The resulting spring elements will be more uniform than the conventional multiple spring construction, thus allowing closer tolerances in the manufacture of the padding and trim material. The seat support elements 22, 24 consist of an upper support member 30, a lower support member 32 and interconnecting struts 34.

The softness of the seat cushions may be controlled by the plastic used, location of the interconnecting supporting struts 34 and/or by filling the cavities formed by the struts with resilient materials such as polyurethane foam 36, as seen in FIGURE 3. In the areas of the seat where heavier loads are expected, and a stiffer area is required for comfort, the angle at which the strut is connected to the support members 30, 32 may be increased until a 90° connection is achieved. As the angle of connection approaches 90°, the stiffness of the supported surface will increase. The thickness of the struts 34 and/or the support members 30, 32 may be increased or decreased to help control the seat comfort.

Another way to control the softness of the seat is to fill the cavities formed by the struts with a resilient material to increase the support in the desired areas. A further control for the softness of the seat may be accomplished by varying the basic constituents of the foam for a harder or softer foam, as is commonly done in the art.

Referring now to FIGURES 4, 5 and 6, there are shown embodiments of the present invention which are similar to the above described structure. Identical reference numerals with the suffix "a" and "b" added to the corresponding elements will be used to identify the modified spring element structures. In these applications, the seat frames 16a and 16b are designed so that the unitary seat back support elements 24a, 24b and the seat support elements 22a, 22b may be connected directly to the seat frames 16a and 16b rather than being nested in seat pan 18, as seen in FIGURES 1–3. More extensive trussing is utilized in these modified structures to compensate for the support supplied by the pans 18, 20.

The modified seat back support elements 24a, 24b are attached to the seat frame 16a by tabs 38 which are bent to secure a foot portion 40 of the support elements 24a, 24b. The rear of the seat support elements 22a, 22b are modified to be secured to the frame 16a by a bolt 42, as seen in FIGURE 4, or, as seen in FIGURE 6, they may have an aperture 44 adapted to fit over a hook 46 of the frame 16b. The fronts of seat support elements 22a, 22b have a foot portion 48 having a slot 50 therein. The slot 50 is adapted to be positioned about a bolt 52 which holds the foot in position on the frame 16a and also allows a certain amount of slippage at the anchor point to permit more flexibility of the seat support elements 22a, 22b.

While the preferred embodiments of the present invention have been shown and described herein it is obvious that many structural details may be changed without departing from the spirit and scope of the following claims.

I claim:
1. A resilient integral plastic seat support element adapted to be mounted on a seat frame, said seat support element having an upper supporting member, a lower supporting member positioned beneath said upper supporting member, strut members interconnecting said supporting members, said upper supporting member being integrally connected to one end of each of said struts, said lower support member being integrally connected to the other end of each of said struts, said strut members forming apertures between said supporting members and at least one of said apertures being filled with a resilient foam to control the softness of said seat support element.

2. A seat support element as claimed in claim 1 having said lower supporting member being formed with feet portions for attaching said support element to the seat frame.

3. A seat structure comprising a frame adapted to support an integral plastic support element, said support element having an upper supporting member, a lower supporting member joined at one end to said upper supporting member and having the other end spaced from said upper supporting member, strut members interconnecting said supporting members, said upper supporting member being integrally connected to one end of each of said struts, said lower supporting member being integrally connect 1 to the other end of each of said struts, said struts forn ing cellular spaces between said supporting members, at least one of said cellular spaces being filled with a resilient foam material to control the softness of said support element, and attaching means associated with said frame to fasten said support element to said frame.

4. A seat structure as claimed in claim 3 having said lower support member formed with feet portions adapted to be secured to said frame and said frame having hooks adapted to cooperate with said feet portions to attach said support element to said frame.

5. A seat structure comprising a frame, a resilient unitary seat support element, hooks on said frame adapted to attach said seat support element on said frame, said support element having an upper support member, a lower support member, resilient struts interconnecting said support members, said struts being positioned to control the softness of said seat structure, said struts forming cellular spaces between said supporting members, at least one of said cellular spaces being filled with a resilient foam material to cooperate with said struts to control the softness of said seat structure, said seat support element being formed with feet adapted to cooperate with said hooks to secure said seat support element to said frame, padding positioned over said seat support element to provide final seat contour and a cover over said padding secured to said frame to complete the seat structure.

References Cited by the Examiner
UNITED STATES PATENTS

| | | | |
|---|---|---|---|
| 2,141,271 | 12/1938 | Gerlofson | 5—361 |
| 2,443,201 | 6/1948 | Sluyter | 267—1 |
| 2,821,244 | 1/1958 | Beck | 5—361 |
| 2,901,028 | 8/1959 | Bottemiller | 297—455 X |
| 3,082,486 | 3/1963 | Khawam et al. | 18—59 |
| 3,085,260 | 4/1963 | Caldemeyer et al. | 5—354 |
| 3,087,171 | 4/1963 | Hoagland et al. | 5—354 |
| 3,099,518 | 7/1963 | Wetzler | 18—59 |

FRANK B. SHERRY, *Primary Examiner.*

ALEXANDER H. BRODMERKEL, *Examiner.*